United States Patent
Marnot

[11] Patent Number: 6,098,990
[45] Date of Patent: Aug. 8, 2000

[54] SEALING DEVICE FOR ROTATING SHAFT

[75] Inventor: Paul Henri Marnot, Cornillon Confoux, France

[73] Assignee: Eurocopter, Marignane Cedex, France

[21] Appl. No.: 09/086,598

[22] Filed: May 29, 1998

Related U.S. Application Data

[62] Division of application No. 08/769,075, Dec. 16, 1996, Pat. No. 5,820,132.

[30] Foreign Application Priority Data

Dec. 21, 1995 [FR] France .................................. 95 15271

[51] Int. Cl.⁷ ..................................................... F16J 15/32
[52] U.S. Cl. ............................ 277/551; 277/572; 277/914
[58] Field of Search .................................... 277/551, 572, 277/914

[56] References Cited

U.S. PATENT DOCUMENTS

| | | |
|---|---|---|
| 3,773,336 | 11/1973 | Walter et al. . |
| 3,866,813 | 2/1975 | Arnold . |
| 4,008,897 | 2/1977 | Wentworth ............................... 277/572 |
| 4,131,286 | 12/1978 | Bainard . |
| 4,669,737 | 6/1987 | Diffenderfer . |
| 5,647,597 | 7/1997 | Grochowski . |
| 5,911,607 | 6/1999 | Lacko et al. . |

FOREIGN PATENT DOCUMENTS

| | | |
|---|---|---|
| A-2245886 | 4/1975 | France . |
| A-2352944 | 4/1975 | Germany . |
| A-2844945 | 4/1980 | Germany . |
| C-3610226 | 6/1987 | Germany . |

*Primary Examiner*—Anthony Knight
*Assistant Examiner*—John L. Beres
*Attorney, Agent, or Firm*—Henderson & Sturm LLP

[57] ABSTRACT

The present invention relates to a sealing device for rotating shaft, intended to prevent leaks of a lubricant medium at a bearing supporting the shaft of a machine, this device including, for this purpose, between stationary parts and rotating parts of the machine, a seal carrier mounted in sealed manner on a stationary part, this seal carrier carrying at least one first annular seal surrounding the shaft and provided with a flexible sealing lip capable of providing sealed contact with a rotating bearing surface integral with said shaft.

4 Claims, 4 Drawing Sheets

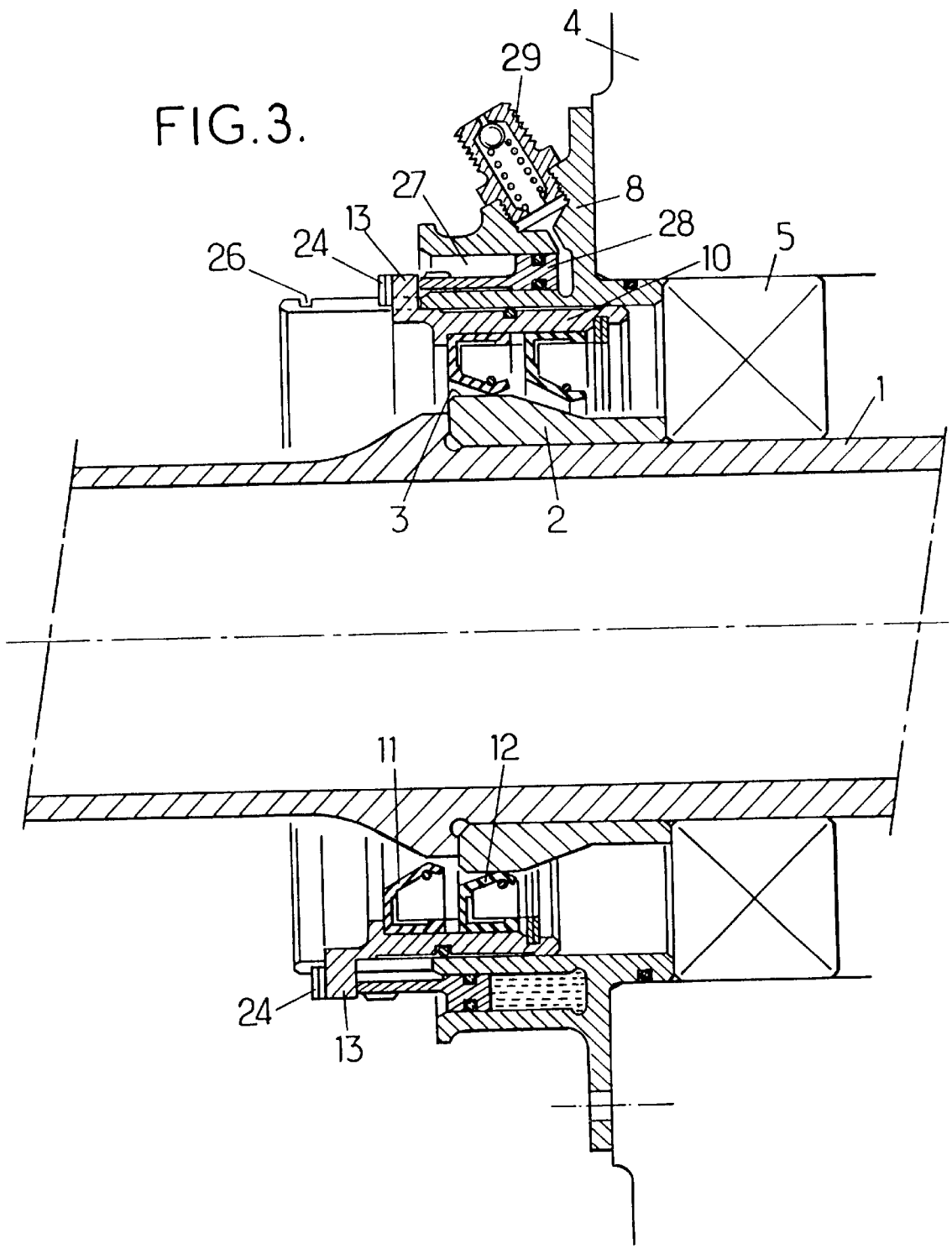

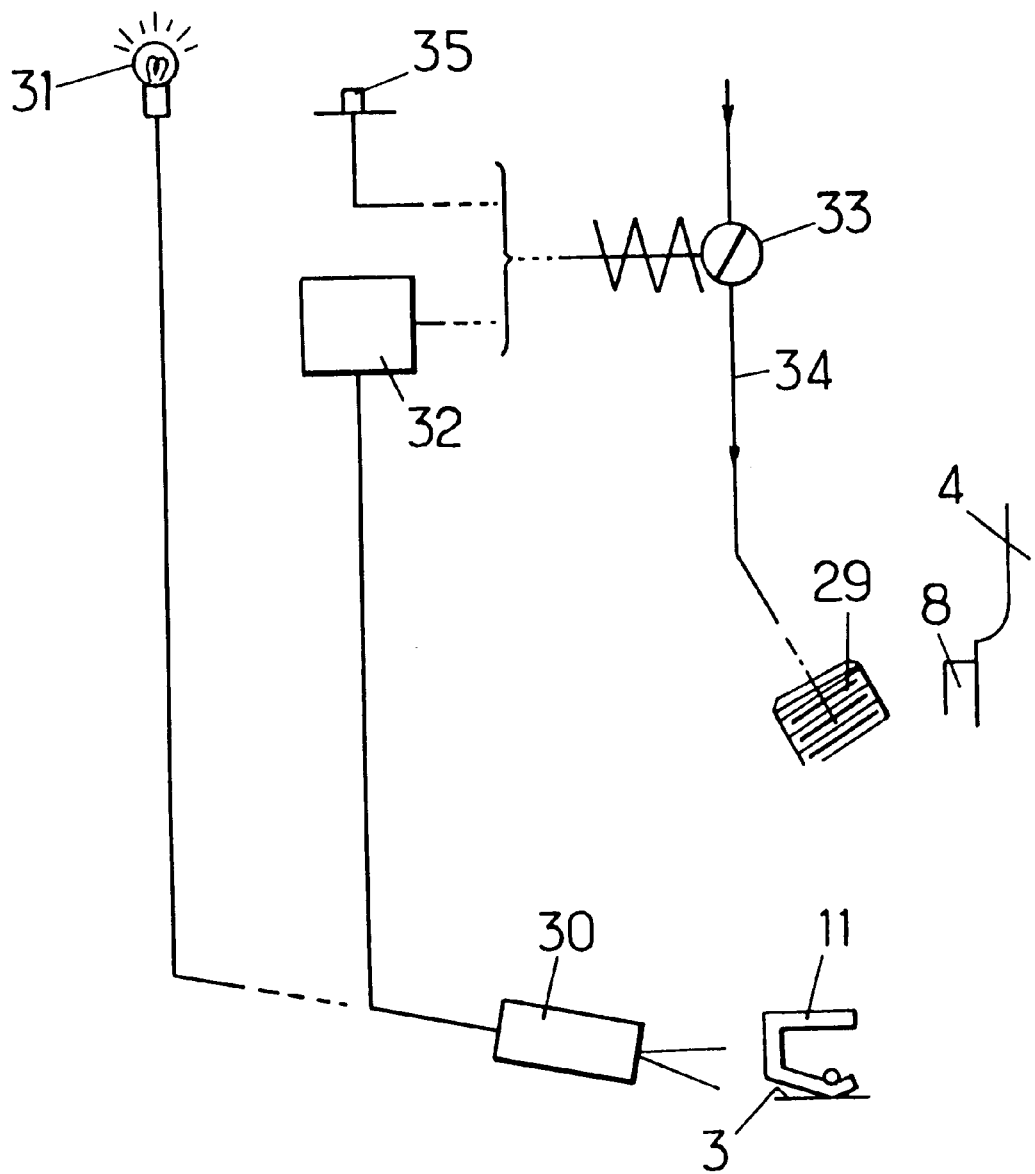

SEALING DEVICE FOR ROTATING SHAFT

This application is a divisional of application Ser. No. 08/769,075 filed Dec. 16, 1996 now U.S. Pat. No. 5,820,132.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a sealing device for rotating shaft, intended to prevent leaks of a lubricant medium at a bearing supporting the shaft of a machine, this device including, for this purpose, between stationary parts and rotating parts of the machine, a seal carrier mounted in sealed manner on a stationary part, this seal carrier carrying at least one first annular seal surrounding the shaft and provided with a flexible sealing lip capable of providing sealed contact with a rotating bearing surface integral with said shaft.

2. Description of the Prior Art

When an oil leak or leak of some other lubricant medium is detected in such a device, it is necessary to dismantle certain components, especially the seal carrier, in order to replace the defective seal with a new seal. In general, in effect, leaks result from wear or some other damage of the lip of the annular seal, irrespective of the care with which the rotating bearing surface of the shaft is made; the leak is rarely the result of deterioration of this bearing surface. Nevertheless, changing a seal still represents an operation which takes time and requires the machine equipped with the shaft in question to be immobilized for some length of time, which may represent a considerable drawback, aside from the increase in the cost of maintaining the machine.

BRIEF SUMMARY OF THE INVENTION

The object of the present invention is to avoid these drawbacks, and to this end, a sealing device of the type defined at the beginning is characterized in that said seal carrier is mounted so that it can move axially on said stationary part and carries at least one additional annular seal of the aforementioned type, the first seal being in rubbing contact with said bearing surface, while the additional seal or seals are normally not in contact with this bearing surface, it being possible for a given-amplitude axial shift of said mobile seal carrier to bring said first seal out of contact with said bearing surface and bring the next first additional seal into contact with this bearing surface.

Thus, as soon as a leak is detected, all that will be required will be to shift said mobile seal carrier axially in order to bring the first seal, assumed to be responsible for the leakage, out of service and bring the second seal (or the other additional seals in succession) into service, something that will not require any dismantling and in any case will require the use only of very simple and quick operations, the saving of time by comparison with that required for dismantling the seal carrier being considerable.

To avoid contact with the worn seal previously in service, as well as with the additional seal following the one which is in service, which would cause needless friction, the device of the invention may further be characterized in that said rotating bearing surface of the shaft, capable of providing sealed contact with the lip of at least one of the annular seals, has axially, on each side of a bearing surface proper, a radially set back region making it possible to contrive for the lip of one single seal to be in contact with said bearing surface.

This device may further be characterized in that said axially mobile seal carrier is mounted as a sliding ring in a stationary annular seal carrier integral with said stationary parts of the machine, sealing between the stationary seal carrier and mobile seal carrier as well as between stationary seal carrier and stationary parts being provided by O-rings, which provides sealing at all levels, between stationary parts and axially mobile parts of the machine.

The mobile seal carrier could be shifted axially and locked in the desired position by any appropriate means.

The device could thus be further characterized in that said mobile seal carrier includes at least one lug accessible from the outside and capable of being locked on a stationary part in at least two axially offset positions, namely a position for which one annular seal provides the seal between said rotating bearing surface of the shaft, and a position for which the immediately next additional seal provides this seal.

It is particularly appropriate to provide that said lug of the mobile seal carrier is arranged so that it can slide in an axial slot of said stationary annular seal carrier and can be locked in at least the two said axially offset positions by a wedge or the like capable of being slipped through a hole in said lug and of passing at the same time and selectively through two pairs of axially offset stationary lugs of said stationary seal carrier. This device displays the advantage of simplicity and also of providing rotational locking of the mobile seal carrier which is prevented from turning inside the stationary seal carrier by its lug, guided by said axial slot.

In another embodiment, it is possible to provide for the use of a screw jack to assume the shifting of the axially mobile seal carrier.

The device could then be characterized in that it includes an annular screw jack mounted on said stationary annular seal carrier and capable of exerting an axial pressure on said lug of the mobile seal carrier.

This annular jack could, for example, include on the one hand a threaded bushing mounted on said stationary annular seal carrier and prevented from rotating with respect to the latter and, on the other hand, an outer ring screwed onto the threaded bushing and capable, by rotating, of exerting an axial thrust on said lug of the mobile seal carrier, a circlip or the like being able to limit the axial displacement of this lug depending on the position in which it is blocked on the stationary seal carrier.

According to another alternative form, it would be possible to use a fluid-pressure annular jack.

In this case, the device could be characterized in that said stationary annular seal carrier internally has an annular chamber including an annular piston capable via one of its ends of exerting a thrust on said lug of the mobile seal carrier, it being possible for its other end to be subjected to the pressure of an actuating fluid, a circlip or the like being able to limit the axial displacement of this lug depending on the position in which it is blocked on the stationary seal carrier.

Such a device may then easily be automated and then be characterized in that it includes means for automatically feeding said annular chamber with pressurized actuating fluid, these means themselves being controlled from a leak detector.

BRIEF DESCRIPTION OF THE SEVERAL VIEWS OF THE DRAWINGS

Embodiments of the invention will now be described by way of non-limiting examples with reference to the figures of the attached drawing in which:

FIG. 3 represents two half-views in axial section of another alternative form of the device, including a jack with actuating fluid; and FIG. 3a diagrammatically represents an automatic control for the device of FIG. 3.

DETAILED DESCRIPTION OF THE INVENTION

Figure 1A:
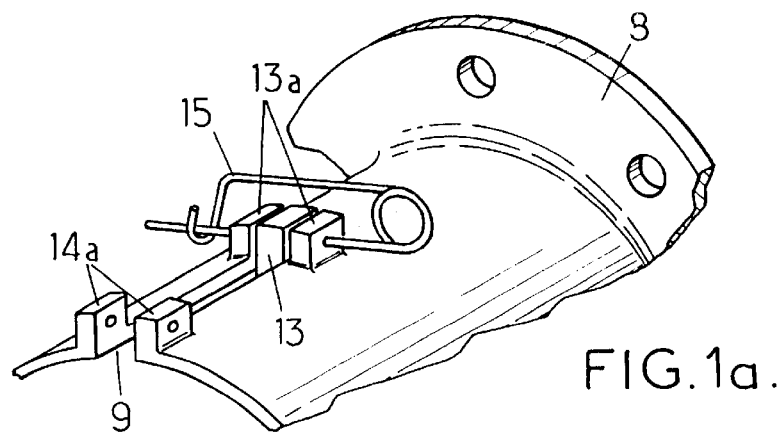
FIG. 1a is an external part view of this device, in perspective.

In all the figures, elements which are identical, similar, or have the same purpose are denoted by the same references. The rotating shaft has been referenced as 1, and as 2 is a ring wedged on the shaft in terms of rotation and axially, this ring on its outside having a carefully machined cylindrical bearing surface 3. The shaft is supported by a stationary machine part 4 via rolling-contact bearings 5. The presence on each side of the bearing surface 3 of radially set back regions referenced 6 in FIG. 1 should be noted. Fixed to the stationary part 4 of the machine, by screws of axis 7 is a stationary annular seal carrier 8 provided with an axial slot 9. On each side of the two ends of this slot, this seal carrier has pairs of lugs referenced 13a and 14a and pierced with two holes opposite each other (which are visible, but not referenced).

Mounted in this stationary seal carrier, in such a way that it can slide like a piston, is an annular and therefore axially mobile seal carrier referenced 10 in an internal cylindrical cavity of which there are fixed two annular seals referenced 11 and 12 respectively, the sealing lips of which are urged radially and inwards by elastic circular snap rings 11a and 12a respectively, all this being in the known way. At its outer end, the mobile seal carrier 10 has a lug 13 pierced with a hole and engaged in the aforementioned axial slot 9. Between the stationary part 4 and the stationary seal carrier 8 on the one hand, as well as between the stationary seal carrier 8 and the axially mobile seal carrier 10 on the other hand, the seal is provided by two small O-rings which are visible but not referenced.

Figure 1:
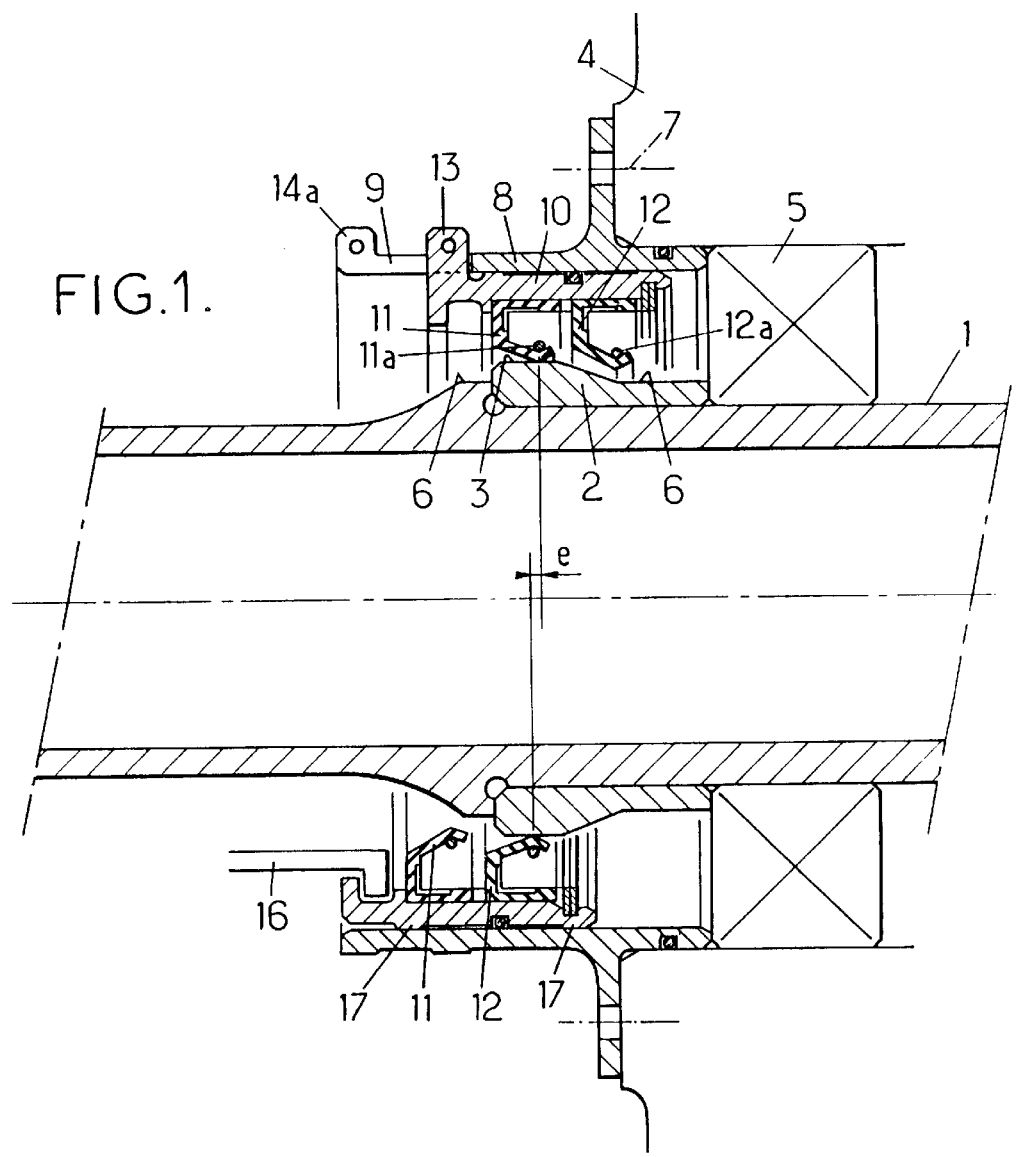
FIG. 1 represents two half-views in axial section of a sealing device for a rotating shaft in accordance with the invention.

That being so, it can be seen in the upper sectional half-view of FIG. 1 that only the first seal 11 provides a seal about the rotating parts, its lip pressing against the bearing surface 3 of the ring 2. The mobile seal carrier 10 is locked in this position by a spindle or pin 15 passing through the holes facing each other of the lugs 13 and 13a, the lug 13 moreover preventing the mobile seal carrier 10 from rotating with respect to the stationary seal carrier 8. When a leak is detected, the leak being due in most cases to wear or damage of the lip of the seal 11, all that is required is for the pin 15 to be withdrawn, the lug 13 to be slid in the slot 9 into the position for which it comes facing the lugs 14a, then for the assembly to be relocked using the pin 15 now passing through the lug 13 and the lugs 14a. In this position, and as visible in the lower sectional half-view of FIG. 1, the additional seal 12 takes over from the worn seal 11, its sealing lip in turn coming into contact with the bearing surface 3 of the ring 2, while the lip of the seal 11 is brought away from this bearing surface.

Represented diagrammatically and partially at 16 is a tool in the form of two half-shells allowing convenient manipulation of the mobile seal carrier 10 in the stationary seal carrier 8. Sliding is favoured by the presence of Teflon-coated bearing surfaces 17 on the mobile seal carrier.

It should also be noted that in order to limit wear on the bearing surface 3, notwithstanding the use of two successive seals 11, 12 (or of a greater number of seals), and if need be to eliminate a leak resulting from a defect on the bearing surface 3, the circular region of this surface 3 which is in contact in succession with the lip of the seal 11 then with the lip of the seal 12 or of the other successive additional seals is offset slightly by an axial distance denoted as e. This measure may be adopted irrespective of the embodiment: all that is required is to contrive for the axial offset of the mobile seal carrier 10 to be different each time, by the value e, from the axial distance separating the lips of two successive annular seals.

Figure 2A:
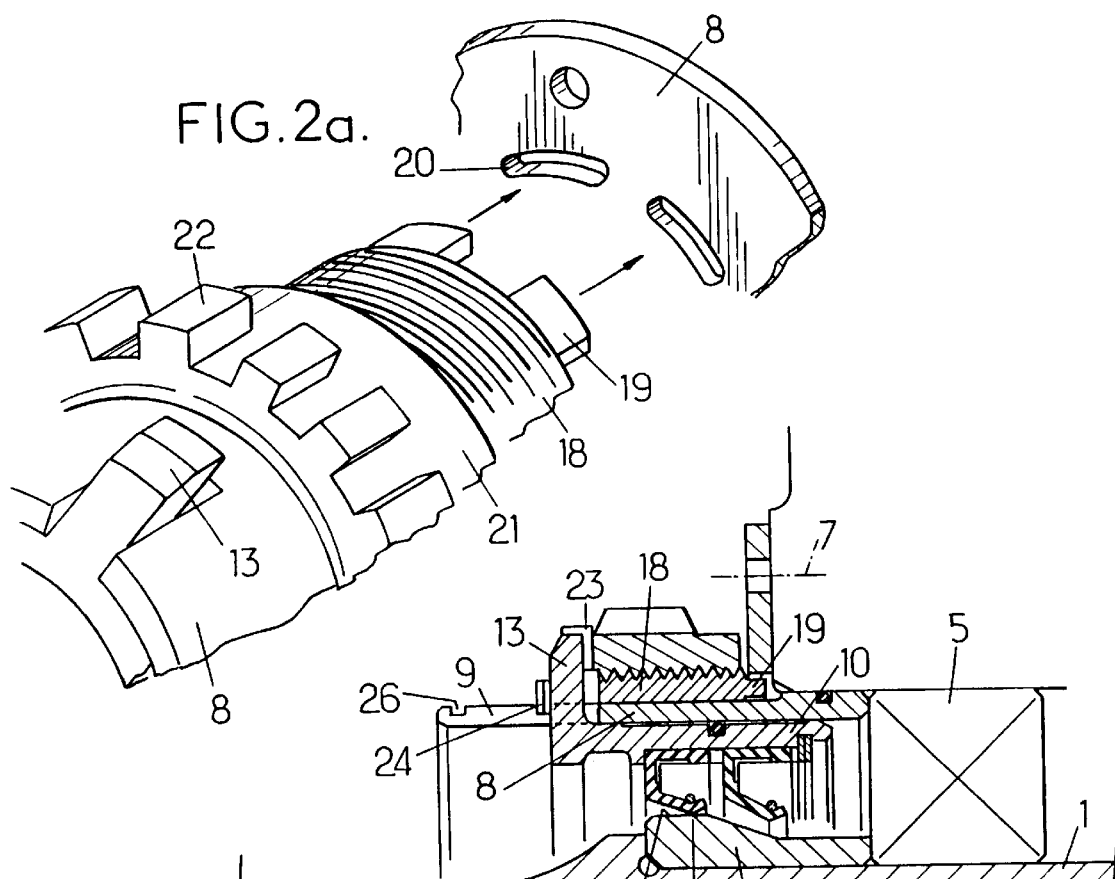
FIG. 2a is an external part view of the device of FIG. 2, in perspective.
Figure 2:
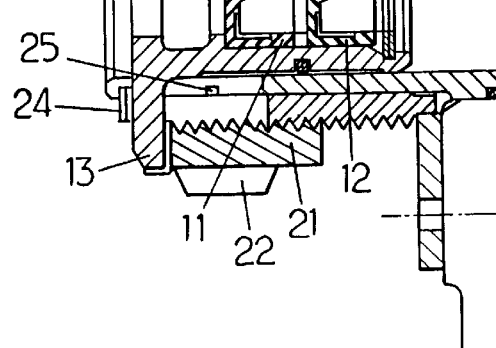
FIG. 2 represents two half-views in axial section of an alternative form with screw jack.

In the embodiment of FIG. 2, use is made of a screw jack for exerting a thrust on the lugs 13 of the axially mobile seal carrier 10. To this end, a threaded bushing 18, for example one made of rigid synthetic material wedged in terms of rotation and axially with respect to the stationary seal carrier 8, has been engaged over the stationary seal carrier 8. To achieve this, tabs 19 at the ends of this bushing engage in oblong holes 20 of the stationary seal carrier. A ring 21 with engagement projections 22 is screwed tight (to prevent untimely rotation) onto the threaded bushing 18 and may thus, when made to rotate (for example using a tool) exert an axial thrust on at least two diametrically opposed lugs 13 of the mobile seal carrier 10, with interposition of a low-friction washer 23. During normal operation, the mobile seal carrier 10 can be locked axially by a circlip 24 snap-fitted into an annular groove 25 of the stationary seal carrier 8, for use of the first seal 11, or into another annular groove 26 of the stationary seal carrier, for use of the additional seal 12 after the previous one has been taken out of service.

In the embodiment of FIG. 3, the stationary annular seal carrier 8 includes an annular chamber 27 in which an annular piston 28 is mounted so that it can slide. A protruding end of this piston bears against the lugs 13 (there being two or three of these distributed at equal angles) of the axially mobile seal carrier 10. The circlip 24 serves the same purpose as in the previous embodiment.

Screwed onto the stationary seal carrier 8 is a self-closing stopper 29 with a ball valve by means of which the chamber 27 may be fed with pressurized actuating fluid, for example using a hand pump. When the first seal 11 is worn, all that is required is for the circlip 24 to be removed and placed in the annular groove 26, and for the pressurized actuating fluid supply to be connected to the stopper 29 in order axially to displace the mobile seal carrier 10, bring the seal 11 out of service and bring the additional seal 12 into service, this requiring just a minimum number of operations, as can be seen.

These operations may moreover easily be automated, for example according to the diagram of FIG. 3a: a leak detector 30 situated close to the lip of the seal to be monitored may provide a visible signal, at 31, together with an electrical signal to an amplifier 32. The latter can then automatically make a solenoid valve 33 situated on the circuit 34 for feeding the stopper 29 with pressurized fluid open. On the basis of the visual signal 31, an operator can also cause the solenoid valve 33 to open by pressing a push button 35. These operations do not require the machine to be shut down.

Finally, it should be noted that between the mobile seal carrier 10 and stationary seal carrier 8, the abovedescribed "clear-cut" physical stops may, if they have to, be dispensed with, the use of positional references making it possible visually and quickly to observe the situation of each of the devices equipped in accordance with the invention.

What is claimed is:

1. A sealing device for preventing leaks of a lubricant medium at a bearing supporting a rotating shaft of a machine, said sealing device comprising an axially mobile seal carrier mounted between said machine and said rotating shaft in a sealed manner on a stationary annular seal carrier, said axially mobile seal carrier comprising at least a first annular seal surrounding said rotating shaft and having a flexible sealing lip for providing sealed contact with a rotating bearing surface integral with said rotating shaft, wherein said axially mobile seal carrier is mounted for axial movement on said stationary annular seal carrier and comprises at least one additional annular seal, wherein said first annular seal is in contact with said rotating bearing surface, while said at least one additional annular seal is not in contact with said rotating bearing surface, and said first annular seal is out of contact with said rotating bearing surface while said at least one additional annular seal is in contact with said rotating bearing surface;

wherein said axially mobile seal carrier is mounted as a sliding ring in said stationary annular seal carrier integral with a stationary part of the machine, and wherein sealing between said stationary annular seal carrier and said axially mobile seal carrier as well as between said stationary annular seal carrier and said stationary part is provided by O-rings;

wherein said axially mobile seal carrier comprising at least one lug for sliding in an axial slot of said stationary annular seal carrier and locking in at least two axially offset positions; and wherein said sealing device includes an annular screw jack mounted on said stationary annular seal carrier, said annular screw jack being capable of exerting an axial pressure on said at least one lug of the axially movable seal carrier.

2. The sealing device of claim 1, wherein said annular jack includes a threaded bushing mounted on said stationary annular seal carrier, said threaded bushing being prevented from rotating with respect to said stationary annular seal carrier, and an outer ring screwed into the threaded bushing and capable, by rotating, of exerting an axial thrust on said at least one lug of the mobile seal carrier, a circlip being able to limit the axial displacement of said at least one lug depending on the position in which said circlip is locked on the stationary annular seal carrier.

3. A sealing device for preventing leaks of a lubricant medium at a bearing supporting a rotating shaft of a machine, said sealing device comprising an axially mobile seal carrier mounted between said machine and said rotating shaft in a sealed manner on a stationary annular seal carrier, said axially mobile seal carrier comprising at least a first annular seal surrounding said rotating shaft and having a flexible sealing lip for providing sealed contact with a rotating bearing surface integral with said rotating shaft, wherein said axially mobile seal carrier is mounted for axial movement on said stationary annular seal carrier and comprises at least one additional annular seal, wherein said first annular seal is in contact with said rotating bearing surface, while said at least one additional annular seal is not in contact with said rotating bearing surface, and said first annular seal is out of contact with said rotating bearing surface while said at least one additional annular seal is in contact with said rotating bearing surface;

wherein said axially mobile seal carrier is mounted as a sliding ring in said stationary annular seal carrier integral with a stationary part of the machine, and wherein sealing between said stationary annular seal carrier and said axially mobile seal carrier as well as between said stationary annular seal carrier and said stationary part is provided by O-rings;

wherein said axially mobile seal carrier comprises at least one lug accessible from outside and capable of being locked on said stationary annular seal carrier in at least two axially offset positions, namely a position for which said first annular seal provides a seal on said rotating bearing surface of said rotating shaft, and a position for which said at least one additional annular seal provides said seal; and wherein said sealing device includes an annular screw jack mounted on said stationary annular seal carrier, said annular screw jack being capable of exerting an axial pressure on said at least one lug of the axially movable seal carrier.

4. A sealing device for preventing leaks of a lubricant medium at a bearing supporting a rotating shaft of a machine, said sealing device comprising an axially mobile seal carrier mounted between said machine and said rotating shaft in a sealed manner on a stationary annular seal carrier, said axially mobile seal carrier comprising at least a first annular seal surrounding said rotating shaft and having a flexible sealing lip for providing sealed contact with a rotating bearing surface integral with said rotating shaft, wherein said axially mobile seal carrier is mounted for axial movement on said stationary annular seal carrier and comprises at least one additional annular seal, wherein said first annular seal is in contact with said rotating bearing surface, while said at least one additional annular seal is not in contact with said rotating bearing surface, and said first annular seal is out of contact with said rotating bearing surface while said at least one additional annular seal is in contact with said rotating bearing surface;

wherein said axially mobile seal carrier comprises at least one lug accessible from outside and capable of being locked on said stationary annular seal carrier in at least two axially offset positions, namely a position for which said first annular seal provides a seal on said rotating bearing surface of said rotating shaft, and a position for which said at least one additional annular seal provides said seal;

wherein said sealing device includes an annular jack including a threaded bushing mounted on said stationary annular seal carrier, said threaded bushing being prevented from rotating with respect to said stationary annular seal carrier, and an outer ring screwed into the threaded bushing and capable, by rotating, of exerting an axial thrust on said at least one lug of the mobile seal carrier, a circlip being able to limit the axial displacement of said at least one lug depending on the position in which said circlip is locked on the stationary annular seal carrier.

* * * * *